Patented Aug. 17, 1954

2,686,810

UNITED STATES PATENT OFFICE 2,686,810

PREPARATION OF METANITROPARA-TOLUIDINE

Alphonse D. Koch, Penns Grove, and Clarence L. Richardson, Salem, N. J., assignors to E. I. du Pont de Nemours & Company, Wilmington, Del., a corporation of Delaware No Drawing. Application March 8, 1952, Serial No. 275,666

7 Claims. (Cl. 260—578)

This invention relates to an improved process for the preparation of metanitroparatoluidine and more particularly to an improvement in the process of preparing it from acetyl metanitroparatoluidine.

Metanitroparatoluidine, i. e., 1-methyl-3-nitro-4-aminobenzene, is an important dye intermediate. Bright red and scarlet azo dyes made from it are widely used in the form of organic pigments for paints and lacquers. Metanitroparatoluidine is ordinarily made by first nitrating acetoparatoluidine and then hydrolyzing off the acetyl group to form the free base. Improvements in the nitration process are described in U. S. Patents No. 1,963,597 and No. 2,128,511, which involve the selection of optimum concentrations of nitric and sulfuric acids. The nitration process has also been adapted to continuous operation. Even with the product made according to these improved processes, however, the free base which is isolated after hydrolysis with caustic is not generally suitable for dye manufacture until it has been further recrystallized from alcohol or other solvent. This additional step adds materially to the cost of manufacture, not only because of the extra operation but also because of the cost of the solvent and the inevitable loss of product which occurs during recrystallization.

It is an object of this invention to provide an improved process for preparing metanitroparatoluidine by the alkaline hydrolysis of acetyl metanitroparatoluidine, which results in a product pure enough to be used directly in dye manufacture, without first having to be recrystallized.

According to the present invention, metanitroparatoluidine of high purity is obtained directly by the alkaline hydrolysis of acetyl metanitroparatoluidine by carrying out the hydrolysis in the presence of small amounts of a water-soluble sulfite and of a normally liquid mononuclear aromatic hydrocarbon.

In a preferred embodiment of this process, acetyl metanitroparatoluidine is suspended in from 2 to 10 times its weight of water in the presence of an excess of caustic, from 1 to 5% of a water-soluble sulfite and from 0.2 to 1% of a mononuclear aromatic hydrocarbon which is liquid at 25° C., the amounts of sulfite and hydrocarbon being based on the total amount of the charge, the suspension is agitated at a temperature of from 70 to 100° C. until hydrolysis of the acetyl compound is complete, the charge is cooled and the metanitroparatoluidine product is recovered by separating the liquid phase from it.

The process of this invention is specifically illustrated by the following example:

Acetyl metanitroparatoluidine is prepared by the continuous nitration of acetoparatoluidine in approximately 75% sulfuric acid at 55°, employing a residence time in the reactor of 45 seconds.

One hundred and fifty (150) grams of this acetyl metanitroparatoluidine, in the form of a paste containing approximately an equal weight of water, are added to an agitated solution in 550 g. of water containing 18 g. of anhydrous sodium sulfite, 5 g. of sodium carbonate, 5 g. of solvent naphtha, and 0.5 g. of the sodium salt of a mixture of dinaphthylmethane sulfonic acids. The latter compound acts as a dispersing agent for the acetyl compound. The sodium carbonate is added to neutralize any acid in the paste, which might otherwise attack the steel equipment before the caustic is added. When all the acetyl compound is suspended, the charge is heated to 90–95° C. and 127 g. of a 30% solution of sodium hydroxide in water are added during one hour. Agitation is continued and the charge is maintained at 90–95° C. It is tested for alkalinity with Clayton Yellow paper, additional caustic being added when the alkalinity by this test falls below pH 11. The hydrolysis is complete in about 8 hours, after which the charge is cooled and filtered. After the metanitroparatoluidine has been washed free from caustic and dried, it has a freezing point of 114.4° or better. When this product is used to make the dyestuff sometimes known as Lithosol Scarlet (Color Index 69) by diazotizing and coupling with beta-naphthol, the resulting dyestuff has the standard bright red shade.

When the hydrolysis is carried out as described above but without the addition of sodium sulfite or solvent naphtha, the resulting metanitroparatoluidine, although apparently of good purity, gives a Lithosol Scarlet dye which is dull and of an undesirable bluish shade and hence is unsuitable.

The sulfite employed in this process is ordinarily sodium sulfite because of its availability and cheapness. Potassium sulfite or any other water-soluble sulfite is also operable. Instead of adding the sulfite as such, it may be prepared in situ by the addition of either sulfur dioxide or the corresponding bisulfite to the alkaline solution. An amount of the sulfite equal to from 1 to 5% of the weight of the charge is preferred. More than 5% of the sulfite may be added to the charge without ill effects, but no advantage is obtained by the use of the extra amount. When less than 1% sulfite is present, the desired degree of purity in the end product is not always obtained.

Solvent naphtha, which is a mixture of xylene and its higher homologs, is an inexpensive and effective aromatic hydrocarbon for use in this process. Xylene, toluene, ethylbenzene, benzene, pseudocumene, and cumene are representative of other hydrocarbons of this class which may be used. The term "aromatic hydrocarbon" as used in the specification and claims is not intended to refer only to the individual pure hydrocarbons, but is also meant to include hydrocarbon mixtures, such as solvent naphtha. To be fully effective, the aromatic hydrocarbon must be a liquid at ordinary temperatures, i. e., about 25° C. It is also desirable that its boiling point should be above the temperature at which the hydrolysis is performed. From 0.2 to 1% hydrocarbon, based on the weight of the charge, is preferred. As in the case of the sulfite, amounts of hydrocarbon lower than the preferred range are not completely effective whereas the use of amounts above this range produces no further advantage and is uneconomical.

The hydrolysis is conducted in the presence of an excess of caustic, which is ordinarily caustic soda, at a pH above 11. The total amount of caustic used is preferably not more than 130% of the theoretical amount. The amount of water present may be varied considerably without significant effect on the reaction. If too little water is present, the charge cannot be stirred properly and if too much water is used, the size of the reaction vessels required becomes uneconomically large. The hydrolysis is conveniently performed at a temperature above that at which the non-aqueous phase solidifies, and below that at which the system boils. The preferred temperature range is from 70 to 100° C. Higher temperatures can be used if pressure equipment is employed, but operation in this manner is relatively inconvenient. Temperatures at which the non-aqueous phase is solid may also be used so long as care is taken to keep the solids well dispersed.

It is desirable although not essential to carry out the hydrolysis in the presence of an alkali-stable water-soluble dispersing agent, such as the sodium salt of a sulfonic or carboxylic acid containing a hydrocarbon radical of 10 or more carbon atoms.

When the hydrolysis is complete, the metanitroparatoluidine is recovered by cooling the charge and separating the product from the liquid phase by filtration, by a combination of decantation and filtration, by centrifuging or by any other convenient dewatering procedure. The crystals may then be washed to remove excess caustic and other impurities.

The unexpected improvement in the purity of metanitroparatoluidine prepared according to the process of this invention is due to the presence of the sulfite and the aromatic hydrocarbon in the reaction mixture during the hydrolysis, although the manner in which these compounds act to produce this effect is not fully understood. Whatever the mechanism, however, this process represents a valuable contribution to the dyestuff art, as it affords substantial economies in the manufacture of the various dyes which are based on metanitroparatoluidine.

We claim:

1. The process of preparing metanitroparatoluidine which comprises suspending acetyl metanitroparatoluidine in from 2 to 10 times its weight of water in the presence of an excess of caustic, from 1 to 5% of a water-soluble sulfite, and from 0.2 to 1% of a mononuclear aromatic hydrocarbon which is liquid at 25° C., the amounts of sulfite and of hydrocarbon being based on the total weight of the charge, agitating the suspension at a temperature of from 70 to 100° C. until hydrolysis of the acetyl compound is complete, cooling, and separating the liquid phase from the metanitroparatoluidine.

2. A process according to claim 1 in which the water-soluble sulfite is sodium sulfite.

3. A process according to claim 1 in which the aromatic hydrocarbon is a solvent naphtha.

4. In a process for preparing metanitroparatoluidine by the alkaline hydrolysis of acetyl metanitroparatoluidine, the improvement which comprises carrying out the hydrolysis in the presence of from 1 to 5% of a water-soluble sulfite and from 0.2 to 1% of a mononuclear aromatic hydrocarbon which is liquid at 25° C., the amounts of sulfite and hydrocarbon being based on the total weight of the charge.

5. In a process for preparing metanitroparatoluidine by the alkaline hydrolysis of acetyl metanitroparatoluidine, the improvement which comprises carrying out the hydrolysis in the presence of from 1 to 5% of sodium sulfite and from 0.2 to 1% of a solvent naphtha.

6. A process according to claim 4 in which the water-soluble sulfite is formed in situ by the addition of sulfur dioxide to the alkaline solution.

7. A process according to claim 4 in which the water-soluble sulfite is formed in situ by the addition of a bisulfite to the alkaline solution.

References Cited in the file of this patent

UNITED STATES PATENTS

| Number | Name | Date |
|---|---|---|
| 2,521,425 | Thompson | Sept. 5, 1950 |

OTHER REFERENCES

Organic Chemistry, Karrer, published by Elsevier Pub. Co., 1950, p. 457.